United States Patent [19]

Brune

[11] Patent Number: 5,013,991
[45] Date of Patent: May 7, 1991

[54] MULTI-VOLTAGE ALTERNATOR WITH INTEGRAL BANK SWITCHED BRIDGE

[75] Inventor: Lyle R. Brune, Beaverton, Oreg.

[73] Assignee: Sure Power, Inc., Tualatin, Oreg.

[21] Appl. No.: 344,269

[22] Filed: Apr. 27, 1989

[51] Int. Cl.$^5$ .............................. H02J 7/14; H02J 7/00
[52] U.S. Cl. ........................................ 320/15; 307/16; 320/17; 322/90; 322/94
[58] Field of Search ...................... 322/90, 94; 320/15, 320/17; 307/16

[56] References Cited

U.S. PATENT DOCUMENTS

| | | | |
|---|---|---|---|
| 3,984,750 | 10/1976 | Pfeffer et al. | 322/90 X |
| 4,045,718 | 8/1977 | Gray | 320/17 |
| 4,047,088 | 9/1977 | Himmler | 320/17 X |
| 4,156,836 | 5/1979 | Wiley | 322/90 X |
| 4,179,647 | 12/1979 | Cummins et al. | 320/17 X |
| 4,829,228 | 5/1989 | Buetemeister | 322/90 X |

Primary Examiner—R. J. Hickey
Attorney, Agent, or Firm—Olson & Olson

[57] ABSTRACT

A silicon controlled rectifier is connected between the output of each stator winding of a conventional alternator and a terminal of a lower voltage battery, and a control electrode of each silicon control rectifier is connected to a switching control circuit for switching the silicon control rectifiers to switch stator current alternatively to a lower voltage battery or to a higher voltage battery connected across the alternator stator. A voltage regulator is connected between the alternator field coil and the lower and higher voltage batteries.

3 Claims, 4 Drawing Sheets

MULTI-VOLTAGE ALTERNATOR WITH INTEGRAL BANK SWITCHED BRIDGE

BACKGROUND OF THE INVENTION

This invention relates to charging systems where the requirement exists for multiple voltages, and more particularly to the distribution of current from a current generating device to the batteries and connected loads of a multi-voltage system.

Many electrical systems utilize separate battery banks or batteries connected in series to provide multiple voltages for starting engines, lighting and supporting electronic equipment. Examples of these systems are found on diesel powered trucks, marine equipment, mililtary and off-road construction equipment. Much of this equipment uses 24 volts or higher for starting engines, powering wenches, lifts and running radar, and 12 volts, for lights, radios and the like.

In such systems the problem exists of maintaining proper battery charge for the multiple voltages while meeting the current demands of the various loads. The conventional charging source, typically an alternator, performs this task for a single voltage, but is not capable of fulfilling the requirements of a multi-voltage system.

The bank switched stator controlled alternator of this invention preferably uses prior art contained in U.S. Pat. Nos. 4,041,363 and 4,224,562 having common ownership with the present invention, for achieving full alternator output on demand for any of the system voltages.

SUMMARY OF THE INVENTION

In its basic concept, this invention provides current to a multiple voltage system from a single charging source, typically an alternator. By controlling a portion of the rectifier bridge, which converts the alternating current generated by the alternator stator to direct current, which is used to charge the batteries and supply power to the loads, current can be directed to different voltage levels as required.

By virtue of this basic concept, the principal objective of this invention is achieved; namely, the total output current of the alternator may be directed to one voltage or another, or the voltage may be split in any combination.

Another objective of this invention is to provide a multi-voltage alternator of the class described which allows for the rapid redirection of current such that, for all practical purposes, each battery and load receives its required current on a continuous basis.

A further objective of this invention is the provision of a multi-voltage alternator of the class described which utilizes "bank switching" of a controlled half bridge to significantly reduce electrical noise.

Still another objective of this invention is to provide a multi-voltage alternator of the class described which allows for the packaging of the entire charging unit in one envelope, rather than requiring several separate components.

A still further objective of this invention is the provision of a multi-voltage alternator of the class described which may regulate one of the required voltages while supplying alternator field current from a different voltage.

A further objective of this invention is the provision of a multi-voltage alternator of the class described which allows for the control of the higher voltages independently of the lower voltages. The foregoing and other objects and advantages of this invention will appear from the following detailed description, taken in connection with the accompanying drawings of preferred embodiments.

DESCRIPTION OF THE PREFERRED EMBODIMENT

For the purpose of this explanation, a system utilizing two voltages, a lower voltage of for example 12 volts and a higher voltage of for example 24 volts, will be assumed.

Figure 1:
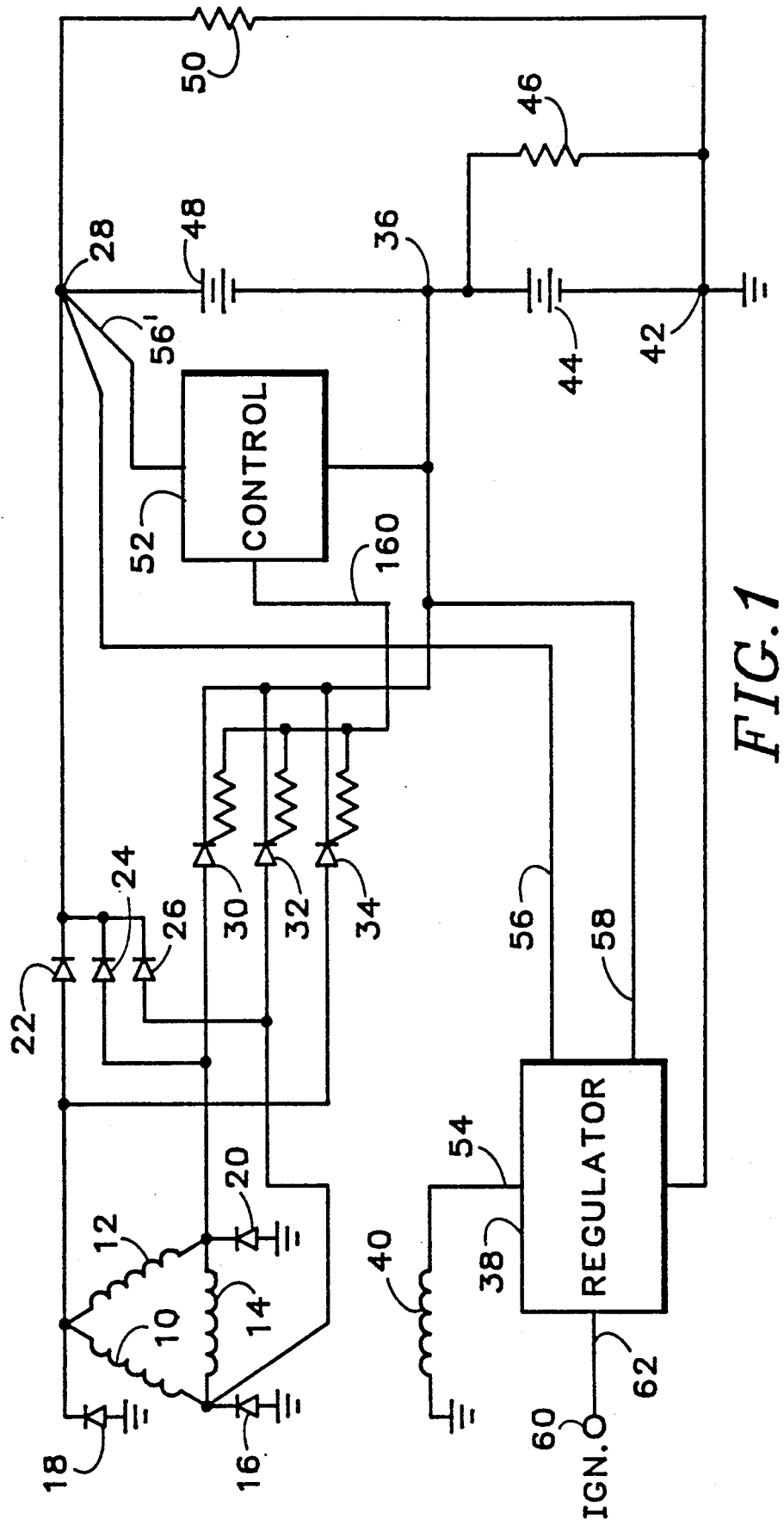
FIG. 1 is a schematic electrical diagram of a multi-voltage alternator with integral bank switching bridge, embodying the features of this invention.

Referring to FIG. 1 of the drawings, the output of the windings 10, 12 and 14 of a conventional delta or wye alternator stator are connected to the conventional rectifier bridge diodes 16, 18, 20, 22, 24 and 26 to provide current to the terminal 28 for the higher output voltage.

In accordance with this invention, a second controlled half bridge, comprising silicon controlled rectifiers (SCRs) 30, 32 and 34 or other controlled switching devices, are connected to the same stator outputs to provide current to the terminal 36 for the lower output voltages.

The current provided by the stator through the bridges is controlled by a voltage regulator circuit 38 which is connected to the alternator field coil 40. This regulator varies the current in the field coil and thus the current in the stator outputs such that the voltage at terminal 36 is maintained at a preset constant value with respect to the common ground terminal 42. This assures a constant charging voltage for the lower voltage battery 44, connected between the low voltage terminal 36 and the common ground terminal 42, and a constant voltage for any loads 46 connected between these same two terminals.

The voltage for the higher voltage battery 48, connected between terminals 28 and 36, is maintained by switching the controlled half bridge SCRs 30, 32 and 34. This allows the current from the stator windings to either pass through battery 48 or bypass it. Since the voltage of the series batteries 48 and 44 are individually maintained in this manner, the total voltage at terminal 28, to the common ground terminal 42 is also maintained for the external load 50. Switching of the controlled half bridge SCRs is controlled by a switching control circuit 52, preferably of the type described in U.S. Pat. No. 4,041,363 aforesaid. This control monitors the voltage of the higher voltage battery 48. When current flows through the higher voltage terminal 28, the voltage across battery 48 increases. The half bridge then is switched, diverting the current of the stator directly to the lower voltage terminal 36. While the half bridge switching is occurring, the voltage at terminal 36 is maintained constant by the voltage regulator 38.

As previously mentioned, the regulator 38 preferably embodies the principals of U.S. Pat. No. 4,224,562 aforesaid. This regulator may be used in place of a conventional regulator with companion alternator. In this example the regulator 38 is connected to the alternator field coil 40 by conductor 54, to the higher output voltage terminal 28 by conductor 56 and to the lower voltage terminal 36 by conductor 58.

Application of a voltage (from a higher or lower source) to the ignition terminal 60 of the voltage regulator 38 supplies voltage through conductor 62 to an integrated circuit voltage regulator 64 (FIG. 2) such as model No. 7805 manufactured by Motorola Semiconductor Products, Inc. This voltage is filtered by diode 66 and capacitor 68. When this voltage is supplied to the input of regulator 64, the regulator output rises to a voltage which is determined by the regulator itself (a voltage that is significantly lower than that applied to the input). This output voltage, filtered by capacitor 70, supplies operating voltage to the circuit of regulator 38.

When operating power is applied, the integrated circuit voltage comparator 72, along with resistors 74, 76, 78 and 80 and capacitor 82, form an oscillator which generates a high frequency square wave. The generated square wave is connected to the input side of transformer 84 through diode 86 and resistor 88. This diode and resistor limits the current in the transformer. The high frequency square wave generated on the transformer output, as a result of said signal on its input, is rectified by diode 90 to form a direct current drive voltage for the gate 92 of the field effect transistor (FET) 94. The magnitude of the gate drive voltage is controlled by resistors 96 and 98 and zener diode 100.

When the gate voltage is present, the FET 94 is turned on. This allows current to flow from the field supply through conductor 56 and diode 102, inserted for reverse polarity protection, through the FET 94 to the alternator field connection 54 and the alternator field 40. As current begins to flow in the alternator field, current also starts to flow in the alternator stator and bridges, as described hereinbefore.

The current flowing from the alternator output causes the voltage of the lower voltage battery 44 to rise. This lower voltage is connected to the voltage regulator sense conductor 58 and by the resistive divider 104, 106 and 108 to the negative input 110 of the integrated circuit voltage comparator 112. The voltage at this negative input is compared to a voltage, derived from the output of regulator 64 by resistive divider 114 and 116, at the positive input 118 of the comparator 112. As the voltage at the negative input rises above the voltage at the positive input 118, the output 120 of the comparator switch is low. This low switched signal stops the high frequency oscillation of comparator 72 and forces the output of integrated circuit voltage comparator 122 high.

With no signal in transformer 82 and the current source, comprising resistor 124 and transistors 126 and 128, allowed to conduct, the drive voltage at gate 92 of the FET 94 is removed. Removal of the gate drive voltage interrupts the current flow through the FET and the alternator field 40, and hence the current in the alternator output also is interrupted. As the alternator output current decreases, the voltage of the lower voltage battery 44 decreases, causing the above described cycle to repeat and maintaining the lower voltage battery at a preset value.

Electrical isolation, as referenced in U.S. Pat. No. 4,224,562 aforesaid is maintained by transformer 84 and current source comprising resistor 124 and transistors 126 and 128. This allows the regulation circuit described hereinbefore to regulate one voltage and the field current circuit to operate from a different voltage.

In the embodiment of FIG. 1, the lower voltage of the system is regulated by regulator 38, since conductor 58 is connected to terminal 36. Further, the field is being supplied by the higher voltage since conductor 56 is connected to terminal 28. The field can be driven from the lower voltage by connecting conductor 56 to terminal 36.

The battery 48 of this example, producing the higher voltage at terminal 28, is maintained at a preset voltage by the concept described as "the electrical switch actuator means" in U.S. Pat. No. 4,041,363.

Figure 2:
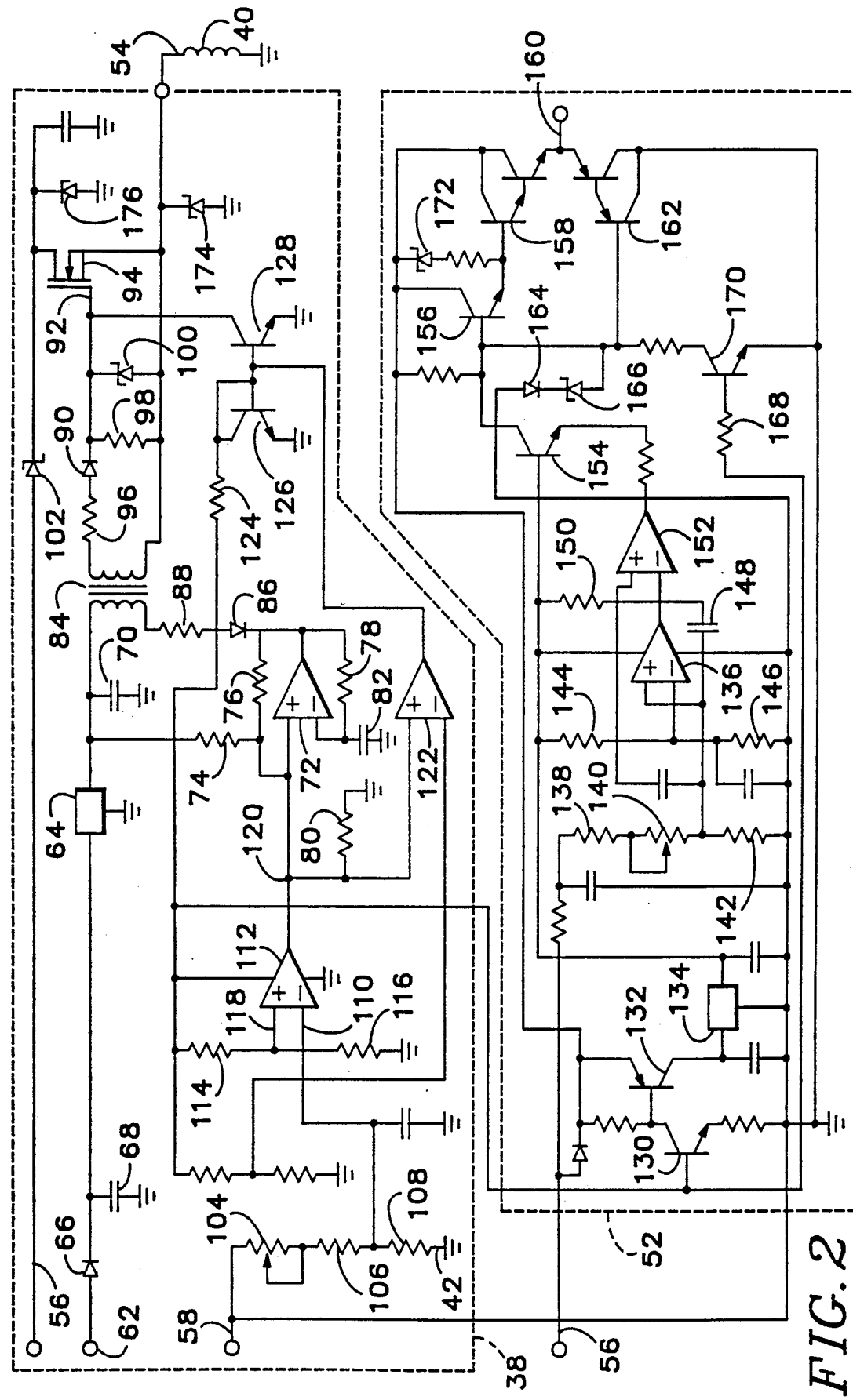
FIG. 2 is a schematic electrical diagram of the swithing control unit and voltage regulator unit of FIG. 1.

Alternator output current is directed to the higher battery voltage terminal 28 or the lower battery voltage terminal 36 by the controlled half bridge, as described hereinbefore. This half bridge is controlled by the switching control 52. Referring to FIG. 2 of the drawings, the circuit is activated when voltage is present at the output of voltage regulator 64. This causes transistors 130 and 132 to conduct, thus providing input voltage to integrated circuit voltage regulator 134, such as model No. 7805 manufactured by Motorola Semiconductor Products, Inc. The input conductors 56' and 58 to the switching control 52 are connected to the higher alternator output terminal 28 and the lower alternator output terminal 36, respectively. As the voltage of battery 48 rises, due to the current flowing in the higher alternator output, the change is monitored by integrated circuit voltage comparator 136 through the voltage divider comprising resistors 138, 140 and 142. The reference voltage for comparator 136 is established by resistors 144 and 146.

When the voltage of battery 48 rises sufficiently, comparator 136 switches. The comparator output is delayed slightly by capacitor 148 and resistor 150. After this delay, integrated circuit voltage comparator 152 switches, causing transistors 154, 156 and 158 to conduct. This causes the gate drive conductor 160 to the controlled half bridge to go high. This action turns the controlled half bridge SCRs 30, 32 and 34 on, diverting the alternator output to the lower voltage terminal 36.

The voltage of battery 48 now will decrease slightly, which reverses the state of the switching control 52. This causes transistor 158 to stop conducting and transistor 162 to start conducting. This forces the voltage at gate driver 160 low and returns the controlled half bridge to the original off state.

Diodes 164 and 166 set the voltage which the gate voltage at conductor 160 will fall during the off state. Resistor 168 and transistor 170 are part of the excitation circuit which activates the switching control 52 when voltage is applied to input conductor 62.

Diodes 172, 174 and 176 provide protection from circuit damage in the event of voltage transience on the circuit inputs or outputs.

Figure 3:
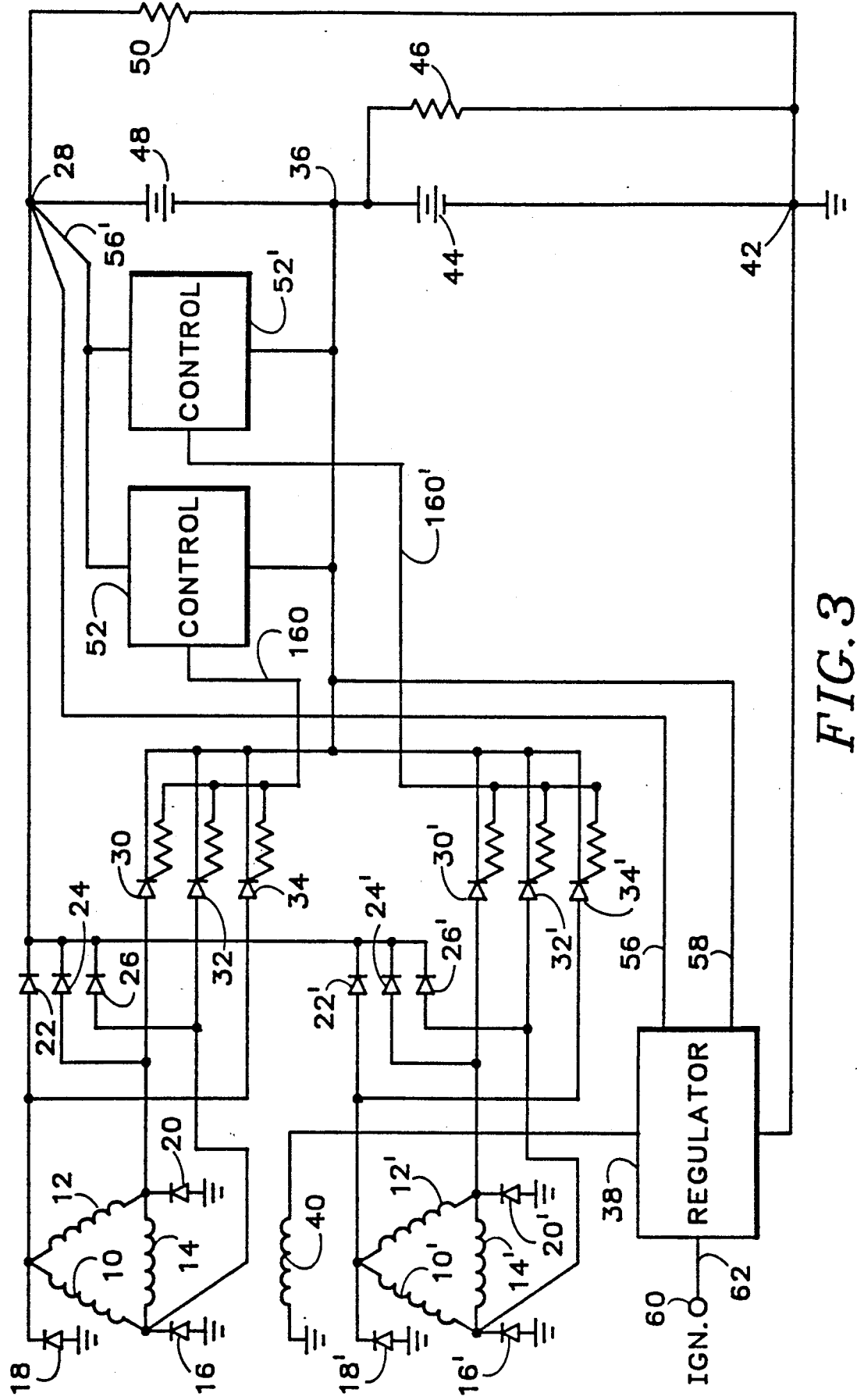
FIG. 3 is a schematic electrical diagram of a multi-voltage alternator configuration having multiple stators and associated integral bank switching bridges.

The performance of the above described system can be significantly improved by utilizing an alternator configuration consisting of multiple stators. This is accomplished by the duplicate components 10', 12', 14', 16', 18', 20', 22', 24', 26', 30', 32', 34' and 52', as illustrated in FIG. 3. The combining of these additional stators results in a reduction of electrical noise in each of the voltage outputs.

Figure 4:
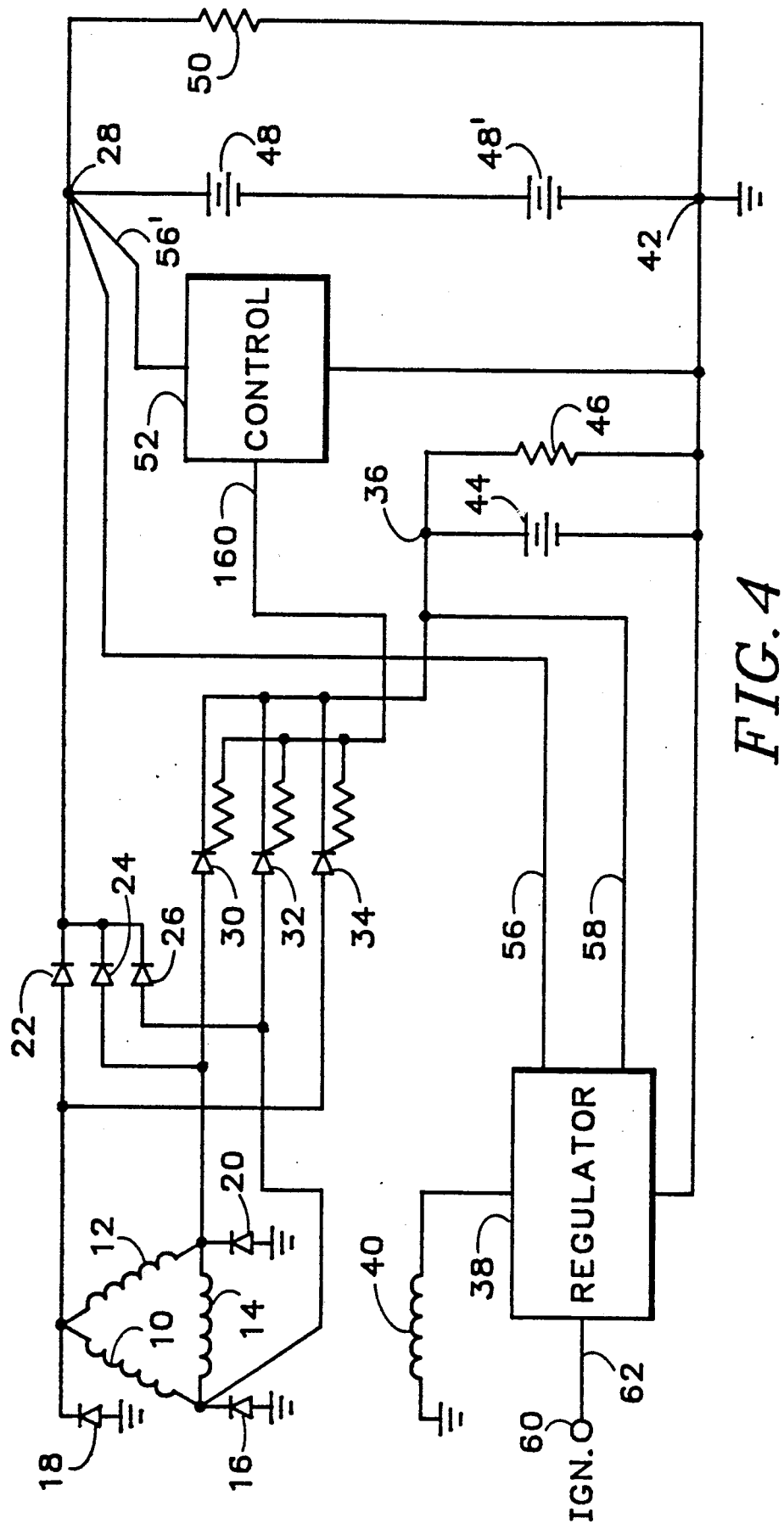
FIG. 4 is a schematic electrical diagram of a multi-voltage alternator with integral bank switching bridge, similar to FIG. 1, but illustrating an alternative battery configuration.

Additionally, systems with battery configurations other than those illustrated in FIGS. 1 and 3, are possible. A common connection configuration is shown in FIG. 4, wherein the higher voltage is provided by two batteries 48 and 48' connected in series between the high voltage terminal 28 and common ground terminal 42, and the lower voltage battery 44 is connected between the low voltage terminal 36 and common ground terminal 42.

It will be apparent to those skilled in the art that various changes may be made in the type, number and arrangement of components described hereinbefore, without departing from the spirit of this invention and the scope of the appended claims.

I claim:

1. A multi-voltage alternator, comprising
   (a) a plurality of interconnected alternator stator coils,
   (b) a rectifier bridge connected to the stator coils and arranged for connection across a battery system which includes batteries of higher and lower voltages,
   (c) controlled switching means forming a half bridge connected to the stator coils and arranged for connection to a lower voltage
   (d) electrical switching control means having an output connected to the control electrodes of the controlled switching means and an input arranged for connection across only a higher voltage battery, and
   (e) voltage regulator means having a sensing input and a field supply input, the sensing input being connected across the lower voltage battery and the field supply input being connected across the higher or lower voltage battery and an output connected to the alternator field coil.

2. The multi-voltage alternator of claim 1 wherein the controlled switching means comprises a silicon controlled rectifier connected to each stator coil output.

3. The multi-voltage alternator of claim 1 including at least two alternator stators each including a plurality of interconnected alternator coils, a rectifier bridge associated with each stator, a half bridge of controlled switching means associated with each stator and an electrical switching control means associated with each stator, and a single voltage regulator means having inputs connected across the higher and lower voltage batteries and an output connected to the alternator field coil.

* * * * *